(12) United States Patent
Kim et al.

(10) Patent No.: US 8,713,308 B2
(45) Date of Patent: Apr. 29, 2014

(54) GAMING MACHINE CERTIFICATE CREATION AND MANAGEMENT

(71) Applicant: IGT, Reno, NV (US)

(72) Inventors: John H. Kim, Reno, NV (US); Matthew D. Kerr, Reno, NV (US); Nicholas M. Hansen-Hiraki, Reno, NV (US); William M. Salivar, Reno, NV (US); Warner R. Cockerille, IV, Sparks, NV (US); A. Michael Kinsley, Reno, NV (US); Regan J. Snyder, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/746,918

(22) Filed: Jan. 22, 2013

(65) Prior Publication Data

US 2013/0145154 A1 Jun. 6, 2013

Related U.S. Application Data

(62) Division of application No. 12/214,537, filed on Jun. 18, 2008, now Pat. No. 8,386,785.

(51) Int. Cl.
*H04L 29/06* (2006.01)
*H04L 9/32* (2006.01)

(52) U.S. Cl.
CPC .......... *H04L 63/0823* (2013.01); *H04L 9/3263* (2013.01); *H04L 9/321* (2013.01); *H04L 63/166* (2013.01)
USPC ........................................... 713/156; 726/10

(58) Field of Classification Search
CPC ........................ H04L 63/0823; H04L 9/3263
USPC ................... 713/156, 168, 175–176; 726/10; 380/28, 30; 463/29
See application file for complete search history.

(56) References Cited

U.S. PATENT DOCUMENTS 5,455,863 A    10/1995    Brown et al.
5,828,862 A *   10/1998    Singkornrat et al. ......... 711/115

(Continued)

FOREIGN PATENT DOCUMENTS

WO    WO 99/30460 A2    6/1999
WO    WO 00/74306 A2    12/2000

(Continued)

OTHER PUBLICATIONS

Ellen Messmer, Network World, "Encryption Key to Next-Gen Slot Machines", Nov. 16, 2007.*

(Continued)

*Primary Examiner* — Samson Lemma
(74) *Attorney, Agent, or Firm* — Foley & Lardner LLP

(57) ABSTRACT

Methods and systems for creating and managing certificates for gaming machines in a gaming network using a portable memory device. A gaming machine creates a certificate signing request which is stored on a portable memory device at the machine. Then, the memory device is coupled with an appropriate CA server. A certificate batch utility program on the server downloads and processes the CSRs. A certificate services program on the server issues gaming machine certificates according to the CSRs. In one embodiment, the certificates are uploaded onto the memory device, along with copies of certificate authority server certificates, including a root CA certificate. Then, the memory device is coupled with the gaming machine and software on the machine identifies and downloads its certificate based on the certificate file name.

25 Claims, 12 Drawing Sheets

(56) References Cited

U.S. PATENT DOCUMENTS

| | | | |
|---|---|---|---|
| 7,063,615 B2 | 6/2006 | Alcorn et al. | |
| 7,294,056 B2 * | 11/2007 | Lowell et al. | 463/17 |
| 7,337,330 B2 | 2/2008 | Gatto et al. | |
| 7,937,749 B2 * | 5/2011 | Deishi | 726/6 |
| 8,261,080 B2 * | 9/2012 | Wilkie et al. | 713/175 |
| 2004/0064691 A1 | 4/2004 | Lu et al. | |
| 2004/0185931 A1 * | 9/2004 | Lowell et al. | 463/17 |
| 2006/0059548 A1 | 3/2006 | Hildre et al. | |
| 2006/0253702 A1 * | 11/2006 | Lowell et al. | 713/156 |
| 2008/0184030 A1 * | 7/2008 | Kelly et al. | 713/156 |
| 2009/0063855 A1 | 3/2009 | Parkinson | |
| 2009/0319796 A1 | 12/2009 | Kim et al. | |
| 2010/0184509 A1 | 7/2010 | Sylla et al. | |
| 2010/0203960 A1 | 8/2010 | Wilson et al. | |
| 2011/0183748 A1 | 7/2011 | Wilson et al. | |

FOREIGN PATENT DOCUMENTS

| | | |
|---|---|---|
| WO | WO 00/74402 A1 | 12/2000 |
| WO | WO 2005/017809 A2 | 2/2005 |
| WO | WO 2005/017809 A3 | 2/2005 |
| WO | WO 2005 069105 A1 | 7/2005 |

OTHER PUBLICATIONS

Google, "Administration, SSL Settings", 2007, pp. 1-8.*

U.S. Office Action dated Sep. 8, 2011 in U.S. Appl. No. 12/214,537.

U.S. Final Office Action dated Apr. 16, 2012 in U.S. Appl. No. 12/214,537.

U.S. Notice of Allowance dated Oct. 24, 2012 in U.S. Appl. No. 12/214,537.

* cited by examiner

*FIG. 11*

Certificate Monitoring Utility

The Certificate Monitoring utility monitors the Certificate store for issued certificates daily.
This utility sends e-mail to the users when the certificates expire within the Days Before Expiration.

Please install all certificates issued by your Certificate Authority in the machine where the certificate Monitoring utility is installed. Otherwise, the certificate will not be monitored for its expiration date.

User Management

[Add User] (1102)  [Edit User] (1104)  [Remove User] (1106)

| FirstName | LastName | Email Address | PhoneNumber |
|---|---|---|---|
| ☐ TEST | TEST | John.smith@xxx.com | 999-777-7777 |

Set Configuration — 1110

| STP Host Name: | yyy.zzz.xxx.com |
| Sender's Email Address: | john.smith@xxx.com |
| Certificate Store Name: | My |
| Maximum Tolerable Days Before Certificate Expiration: | 11 |
| E-mail Alert Freq.In Hours: | 24 |
| Certificate Issuer Name: | CN=Expired Certificate |
| Certificate Store Location: | CurrentUser |

[Test Email Alerts]
[Update Configuration]

[Start Monitoring] [Stop Monitoring]   [Get Expiring Certificates] [Get Expired Certificates]

1112

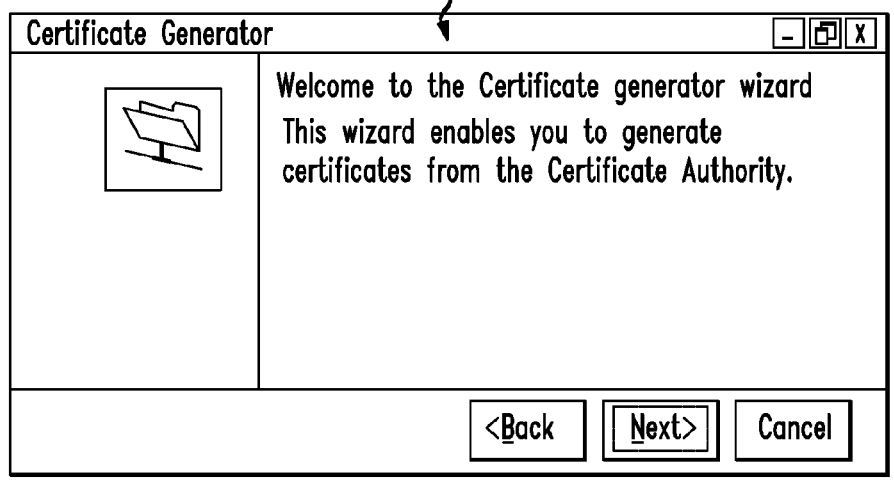
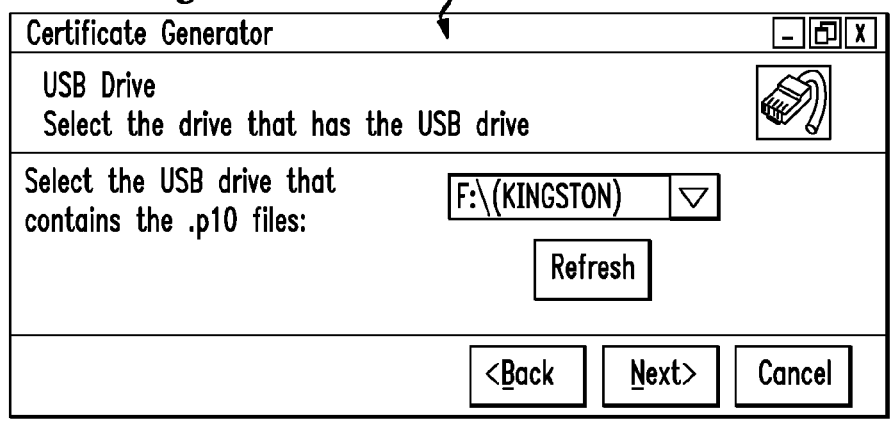
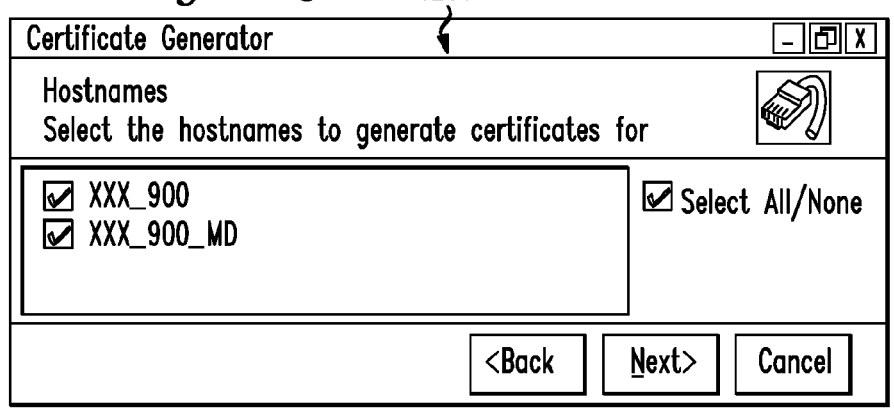

GAMING MACHINE CERTIFICATE CREATION AND MANAGEMENT

CROSS-REFERENCE TO RELATED APPLICATION

This application is a divisional application of U.S. patent application Ser. No. 12/214,537, entitled "GAMING MACHINE CERTIFICATE CREATION AND MANAGEMENT" and filed on Jun. 18, 2008, now U.S. Pat. No. 8,386,785, which is hereby incorporated by reference in its entirety and for all purposes.

BACKGROUND OF THE INVENTION

1. Field of the Invention

The present invention relates to wager gaming networks and underlying data security infrastructure. More specifically, it relates to creating, distributing, and managing certificates for enabling secure communication of data among components in a gaming network.

2. Description of the Related Art

Gaming regulators generally require that communication channels between gaming machines and other components, such as communication servers, in a gaming network, be as secure as currently available technologies allow. One of the more secure modes of communication in a network is through the use of a Secure Socket Layer (SSL) or Transport Layer Security (TLS) which may be utilized in gaming networks. However, in order to implement SSL, certificates may need to be distributed to end points in a network, namely gaming machines and devices and servers.

One method of providing gaming machines with certificates, containing various data such as a machine's public key, is to electronically transmit the certificate over a server-based gaming network using Simple Certificate Enrollment Protocol (SCEP). However, issuing a certificate to a legitimate machine from the certificate authority over a network requires the use of passwords to authenticate the machine. The number of passwords needed may be directly proportional to the number of actual gaming machines and devices receiving new certificates. In other embodiments, the same password may be used for all machines. Managing a few passwords, known to various, albeit trusted, casino employees requires diligence and reliance on those employees who have the password to not reveal the passwords, whether deliberately or accidentally, to unauthorized parties. Managing hundreds or thousands of passwords in a large casino environment is likely to be a persistent security risk in the network and verges on being unworkable. On the other hand, having only one password for all machines raises the ominous prospect that an entire security scheme for a gaming network may be compromised if that one password is leaked. In one scenario, a password is entered into a gaming machine by a casino floor operator which is used to authenticate the machine to a certificate authority server over a network. The same password is used for all gaming machines in a network or in a section of a casino floor, placing paramount importance on the password. If the password is compromised, the security of the all gaming machines in the network may be compromised. It is generally known in the computer and network security fields that passwords are often the weakest link in a security infrastructure and are the most vulnerable aspect of a security scheme.

However, the fact remains that in order to implement SSL in a network, communicating end points that want to benefit from SSL need to have certificates. For example, certificates are used by end points (e.g., a gaming machine and a communication server) to authenticate each other, that is, perform a "handshake." Only after this is done, can an SSL or TLS channel be established, after which a session key, for example, may be exchanged between the two end points for further routine game-related communication.

SUMMARY OF THE DESCRIBED EMBODIMENTS

Methods and systems for creating and managing certificates for gaming machines in a gaming network using a portable memory device and without the use of passwords are described in the various embodiments. A gaming machine in need of a certificate creates a certificate signing (or issuing) request, referred to as a CSR. The CSR file is uploaded to a memory device, such as a USB key, by a casino floor operator. The memory device may be taken to numerous gaming machines by the operator where it is inserted or coupled with the gaming machines and loaded with CSRs. In one embodiment, a CSR may contain a public key, gaming machine identifiers, and a digital signature. The memory device is handed over to a certificate authority (CA) security officer at the casino who has access to certificate authority servers.

The memory device is coupled with a server, such as an appropriate sub-CA server. A certificate batch utility program on the server downloads and processes the CSRs. A certificate services program on the server issues gaming machine certificates according to the CSRs. The batch utility program facilitates the processing and issuing of the certificates, of which there may be hundreds or thousands. The issued certificates are given unique names that may include gaming machine identifiers. In one embodiment, the certificates are uploaded onto the memory device. One or more copies of certificate authority server certificates, including a root CA certificate, may also be uploaded onto the memory device. In another embodiment of this invention, a batch utility program stores the issued certificates in a shared folder of the sub-CA server, and the gaming machines download the issued certificates over the network from the shared folder. A gaming machine downloads the CA certificates and the certificate that corresponds to its own certificate signing request.

In another embodiment, the CA security officer hands the memory device storing the issued certificates and CA certificates to a casino floor operator. At the machine, the operator inserts or couples the device and software on the machine identifies and downloads its certificate based on the certificate file name. The machine also downloads copies of the CA server certificates which it uses to validate the certificates. The floor operator ensures that the correct root CA certificate is downloaded by performing a visual comparison of a root certificate hash value (downloaded from the memory device) and displayed on the machine device with a hardcopy printout of the value obtained from the CA security officer. The machine may then perform a certificate chain validation to ensure that all the downloaded certificates are issued by trusted CAs. During the validation, the machine ensures that the certificate issue date is before the machine's internal clock time and day, and that the certificate has not expired (i.e., that the gaming clock date/time is not past the expiration date). The machine also ensures that the certificate is not revoked by the root CA or sub CAs by downloading either the Certificate Revocation List (CRL) or a Online Certificate Status Protocol (OCSP) response. In this manner, the gaming machine obtains a valid certificate (which it can use to authenticate itself to other gaming network components) without the use of potentially vulnerable security measures, such as the use of passwords over network connections for transmitting certificate signing request files to a Certificate Authority.

One embodiment is a method of obtaining a certificate for a gaming machine that may be used for authenticating the gaming machine to components in a gaming network. A certificate signing request is generated for obtaining an issued certificate from a trusted certificate authority. The signing request may contain a gaming machine public key, a gaming machine identifier, and a digital signature of the gaming machine that is signed by the private key associated with the gaming machine public key. The coupling or insertion of a memory device into the gaming machine is detected and the signing request is stored on the memory device. A certificate is created by the certificate authority for the gaming machine and is stored, along with one or more certificate authority (CA) certificates, on the memory device by a certificate authority server. In one embodiment, a second coupling of the memory device, now storing the gaming machine certificates and CA certificates, is detected at the gaming machine. A value associated with a root CA certificate may be displayed on the gaming machine and may be used in a visual comparison to ensure that the correct root CA is stored on the memory device. After the root certificate is stored in the gaming machine, it verifies all other certificates using certificate chain validation against the trusted root certificate before copying any certificate from the memory device. The gaming machine identifies a specific certificate file on the memory device and stores the file on the gaming machine, together with the CA certificates.

BRIEF DESCRIPTION OF THE DRAWINGS

References are made to the accompanying drawings, which form a part of the description and in which are shown, by way of illustration, particular embodiments:

FIG. 11 is a diagram of a screenshot from the user interface of certificate monitoring utility in accordance with one embodiment; and FIGS. 12A to 12D are sample screenshots of a batch certificate utility in accordance with one embodiment.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order to not unnecessarily obscure the present invention.

Methods and systems for creating security certificates for wager gaming machines and storing the issued certificates on the machines without utilizing passwords for communications between the gaming machines and certificate authority ("CA") servers are described in the various figures. A gaming machine having a certificate is able to authenticate itself to servers in a gaming network, such as communication servers ("comm" servers) in a server-based gaming network.

Figure 1:
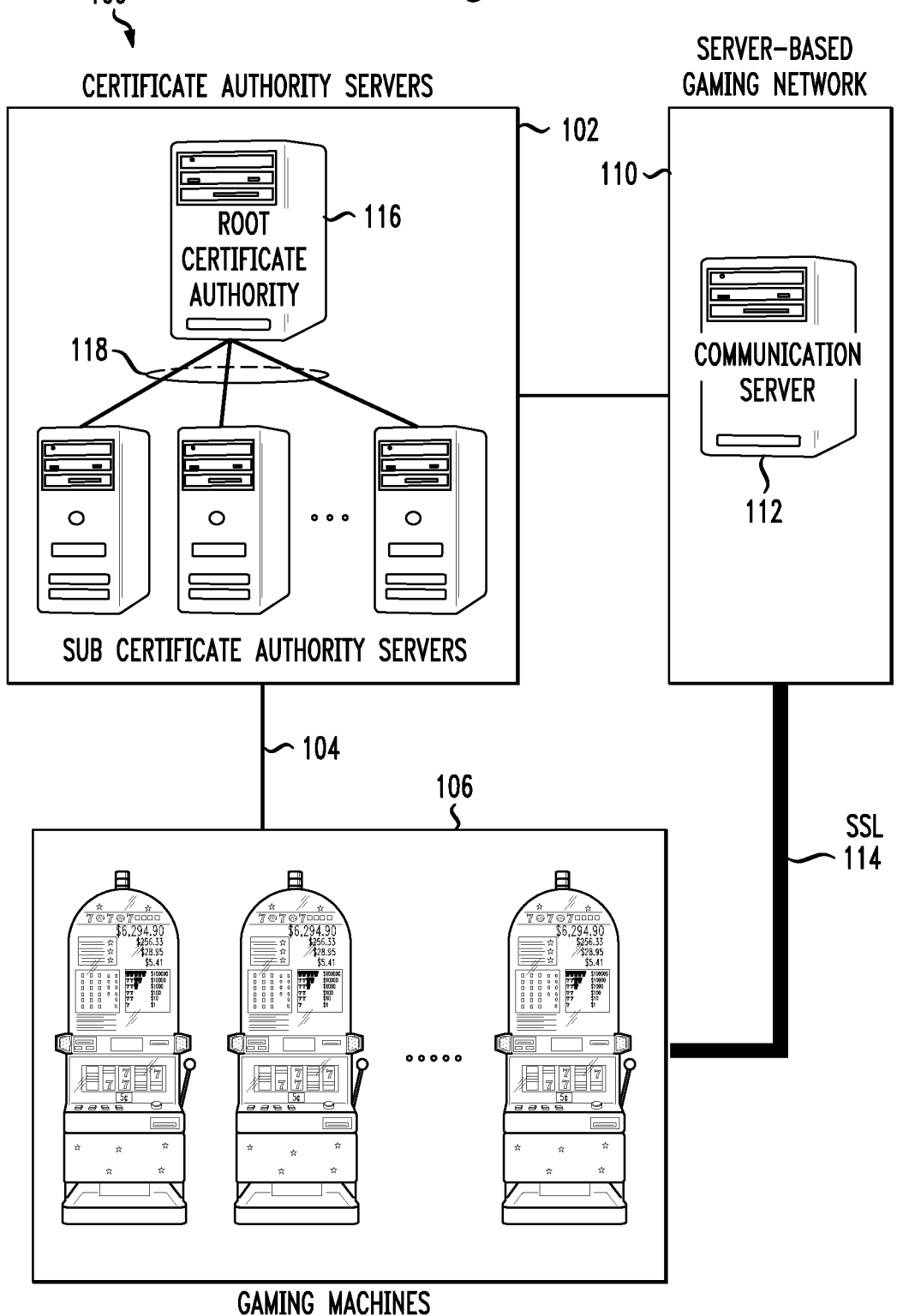
FIG. 1 is an overview diagram of a gaming network showing categories of components relevant to the various embodiments of the present invention.

FIG. 1 is an overview diagram of a gaming network 100 showing categories of components relevant to the various embodiments of the present invention. Certificate authority servers 102 are connected via network connections, represented in FIG. 1 by line 104, with gaming machines 106. Certificate authority servers 102 are connected via network connections, shown in FIG. 1 by line 108, with a gaming network 110, specifically a comm server 112, for example, in a server-based gaming network. In one embodiment, gaming machines 106 communicate via a secure socket layer (SSL) connection or other secure network connection 114 with comm server 112. In order to establish an SSL communication between the gaming machines and host servers in the gaming network, a gaming machine may be required to authenticate itself to a host server or perform a handshake operation with a host server, such as comm server 112, before an SSL connection is established. One way a gaming machine may authenticate itself to a host server or any component in a gaming network is by presenting its certificate, issued by a trusted certificate authority that the other component trusts. Typically the component will also authenticate itself to the gaming machine and similarly present a certificate issued by a trusted CA to the gaming machine. The two certificates may be issued by the same trusted certificate authority, in which case it is implied that both components trust the CA and there are no additional steps to authenticate each other using their certificates.

There are various configurations in which the CA servers may be implemented. In one embodiment, root or trusted certificate authority server 116, essentially a server having software to create certificates for sub-CA servers (described below), may physically reside at and be operated by a third-party gaming machine manufacturer and gaming provider, such as IGT of Reno, Nev. In another embodiment, root CA server may be located at a casino or gaming operator premises. A gaming operator may decide whether to maintain its own trusted CA server or have a third party manage and operate it. There are several factors that may be considered by the gaming operator. For example, if the operator is a large casino or has a multi-national operation, it may want to have control over the CA server. On the other hand, if it is a small to medium-sized gaming operator, they may prefer that a service provider, such as IGT, with experience or expertise in managing a security infrastructure, such as PKI, operate the root CA server for the benefit of the gaming operator. There may be other considerations in having a third-party provider operate the server, such as allowing components in a gaming operator's network to authenticate themselves to components in another gaming operator's network, which also uses the same root CA server. Thus, secure intra-casino communication (e.g., via SSL) is possible when casinos utilize a root CA server managed by a third-party provider. If a gaming operator having multiple locations decides to maintain its own root CA server, components in the network at one location (e.g., Las Vegas) can authenticate themselves to components at another location (e.g., Macau) which is operated by the same gaming operator, thereby providing inter-casino communication between networks at different geographic locations of the same gaming operator.

Figure 3:
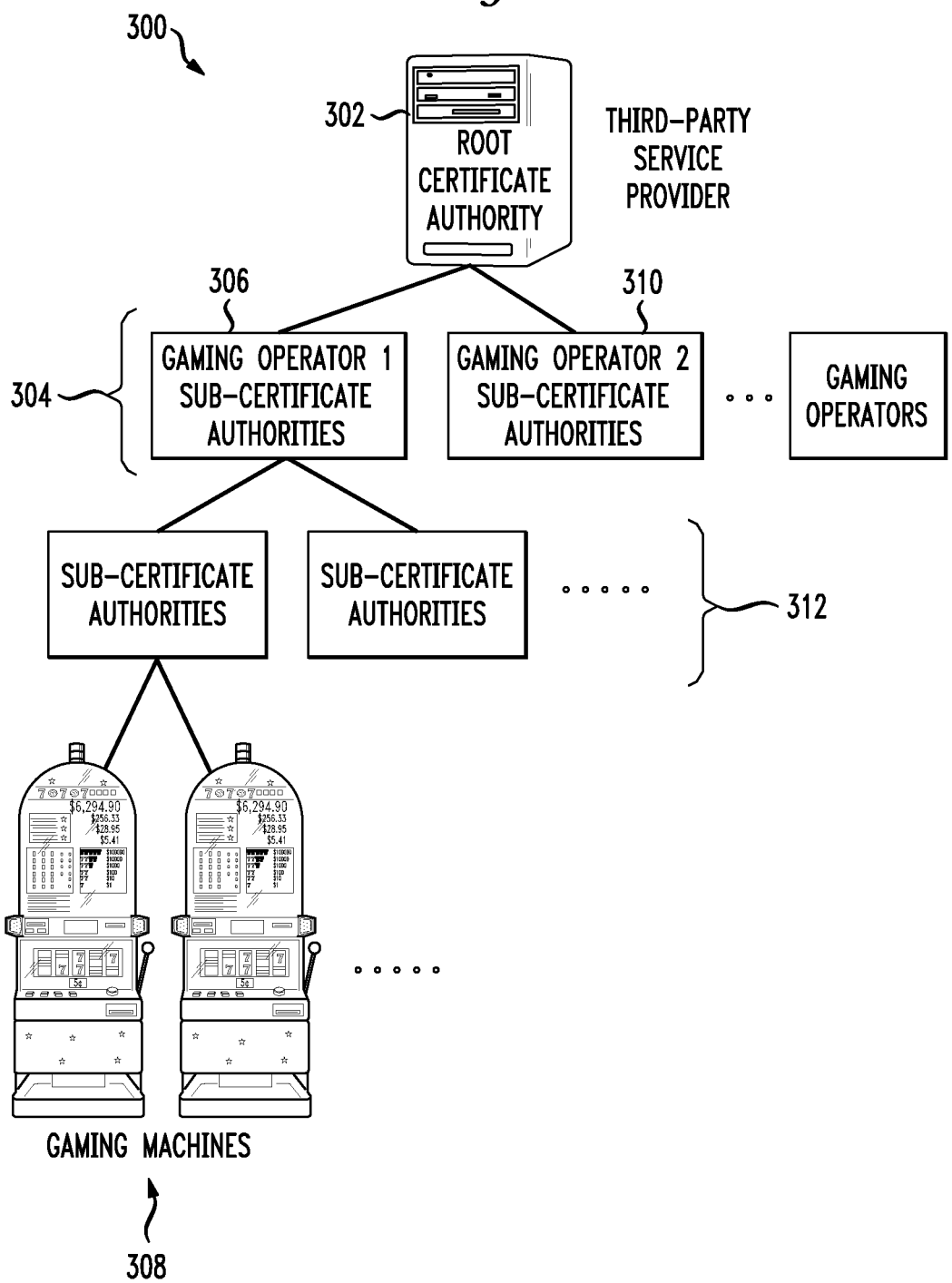
FIG. 3 is a block diagram showing a sub-CA server hierarchy in a wager gaming context in accordance with one embodiment.

Sub-certificate authority servers are network components that manage certificate signing, creation, revocation, and other operations at a gaming operator premises and, in one embodiment, have wired network connections with one or more gaming machines at the same physical premises. In one embodiment a sub-CA server services a specific number of gaming components (the number may vary widely, e.g. 50 to 500) at a casino, where the gaming machines may be in the same section or area of the casino. The number of gaming components managed by one sub-CA server, whose specific role is described in greater detail below, may be determined by the gaming operator. Each sub-CA has a connection to either another parent sub-CA (not shown in FIG. 1), creating an intermediate sub-CA hierarchy or to a root CA server, as shown by lines 118. There may be a hierarchy of sub-CA servers at a gaming operator premises as shown in FIG. 3. The number of layers in the sub-CA hierarchy may depend on the size of the casino, number of gaming machines, tables, devices, etc., and other factors. As is known in the art, by using virtualization software, a single physical server computer (a single "box") may operate two or more logical sub-CA servers, each logical sub-CA server servicing a group of gaming machines.

As noted above, some embodiments address providing certificates to gaming machines so that they can authenticate themselves to other components, such as gaming network communication servers. The sub-CA servers described in FIG. 1 and in the figures below are for creating and managing certificates for gaming machines. As noted above, a group of gaming machines is typically serviced by one sub-CA server. The number of machines in each group does not have to be the same for each sub-CA server. Some servers may have the capacity to manage 500 gaming machine certificates while others may only be able to handle 50. Although FIG. 1 shows individual gaming machines, gaming tables and mobile gaming devices, such as tablets or PDA-type devices, also need certificates and may be included within gaming machines 106. The only physical requirement of such alternative gaming devices is that they have ports for a certain type of memory device, described below, which is currently present in most gaming machines, such as a USB port or a Firewire port.

The gaming network may be a server-based or a non server-based gaming network. In one embodiment of a gaming network, gaming machines and other game play components in the network, such as handheld devices, communicate with comm servers, which handle the authentication, security, and other services, such as gaming theme changes. In other embodiments, a comm server may not be utilized and gaming machines may communicate directly with each other or with components in the gaming network. An example of a server-based gaming network is the network developed by IGT of Reno, Nev. that operates under the G2S protocol developed by the Gaming Standard Association (GSA).

Figure 2:
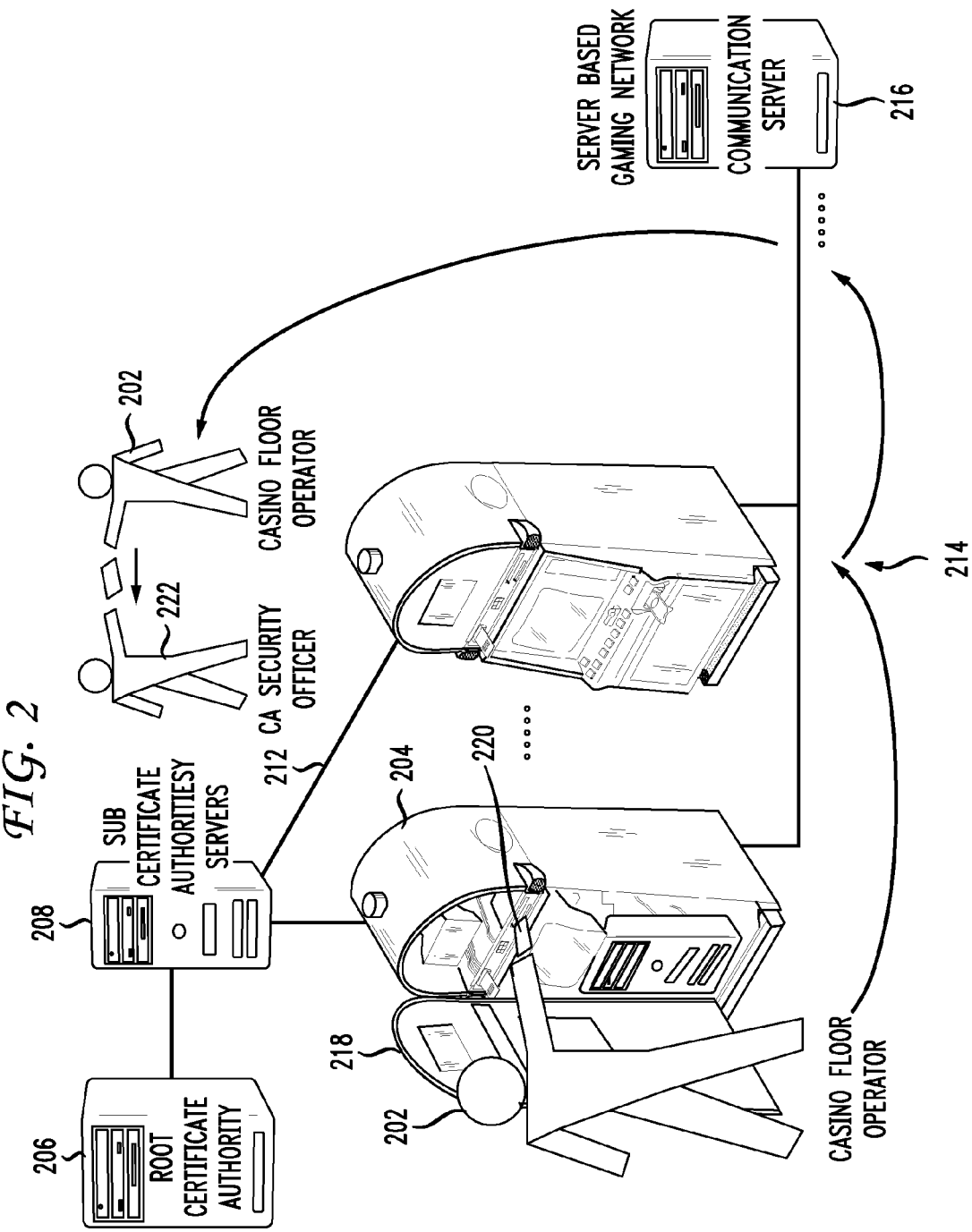
FIG. 2 is a network diagram showing components of a gaming network and actions taken by a casino floor operator on a gaming machine in accordance with one embodiment.

FIG. 2 is a network diagram showing some of the components described in FIG. 1 and actions taken by a casino floor operator 202 on a gaming machine 204 in accordance with one embodiment of the present invention. Shown is a root or trusted CA server 206 (which may be at a third-party site or at the casino) connected to a sub-CA server 208. However, typically the root CA is powered down and offline. The root CA may be online so that it may provide certain data (e.g., revocation lists, described below) to sub-CAs in an enterprise network. Sub-CA server 208 has wired connections 212 with multiple gaming machines 214 as described above. Gaming machines 214 are connected to a gaming network comm server 216 in the specific embodiment. Casino floor operator 202 is a casino employee who is trusted and authorized to service gaming machines and is able to open the machines for maintenance and has a key to open main door 218 on the front of machine 204. In many cases, only a portion of machine 204, such as the main cabinet, may be opened using main door 218 (keeping the top box closed) to perform the operations described. Operator 202 is able to view data on a gaming machine monitor in order to perform the operations. In one embodiment, floor operator 202 may open gaming machine 204 and insert a memory device 220 into machine 204 to either upload data onto device 220 or download data from device 220 onto machine 204. In the described embodiment, memory device 220 is a USB device. In other embodiments, memory device 220 may be another type of hot-swappable, re-writable memory device, such as a Firewire-enabled device. Gaming machines 214 have a port or connection means to read and write data from device 220 in a relatively convenient manner which casino floor operator 202 can use efficiently.

As described below, casino floor operator 202 walks from machine to machine and performs essentially the same operation on each machine, which in one embodiment is inserting the same memory device 220 into each machine (gaming network server, such as communication server 216 or other gaming component may use different methods). Once floor operator 202 has serviced all gaming machines 214 in her section, and in the process accumulates data on memory device 220, device 220 is physically handed off to a casino certificate authority (CA) security officer 222 who manages sub-CA servers 208 at the casino. In other embodiments, different types of memory devices may be used. For example, a compact flash card, SC card, or a FireWire device, among other removable, re-writtable, and hot-swappable memory devices that can be coupled with a particular gaming machine may be used.

FIG. 3 is a block diagram showing a sub-CA server hierarchy 300 in the wager gaming context in accordance with one embodiment. As noted in FIG. 1, root or trusted CA server 302 may be maintained by a third-party service provider, such as IGT, or any other "neutral" trusted third party. Each box in the second level 304 of hierarchy 300 may represent a sub-hierarchy of intermediate sub-CA servers. That is, box 306 labeled "gaming operator 1 sub-certificate authorities" may itself be a hierarchy of sub-CA servers at a casino where the top-most server in the hierarchy is connected to the root CA server and the bottom servers are connected to the "leaf" sub-CA servers as shown in FIG. 3, which in turn are connected to the gaming machines. In another embodiment, there may only be one layer of sub-CA servers (or one sub-CA server) that is connected to 308 gaming machines and to root certificate authority 302. Also, as noted above, a single server computer may be logically "divided" to run two or more virtual sub-CA servers on one physical server computer.

In the embodiment shown in FIG. 3, gaming machines under box 310 that are operated by a different casino (gaming operator 2) may communicate securely with gaming machines operated by gaming operator 1. In the embodiment where root CA server 302 is operated by a third-party provider, boxes in level 304 may have "casino site 1," "casino site 2," and so on in place of "gaming operator." Within each box for site 1, site 2, etc., there may be the same type of sub-hierarchy of intermediate sub-CA servers 312 as described. Some gaming operators may have expansive networks and operations, with sites at different locations across the world, and may have thousands of gaming machines, thereby needing a multiple layer sub-hierarchy of sub-CA servers 312.

Figure 4:
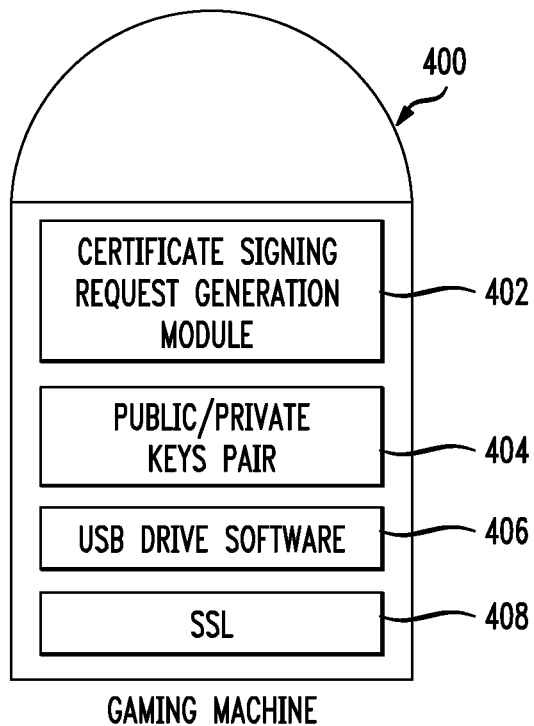
FIG. 4 is a logical block diagram of a gaming machine showing relevant data and software modules in accordance with one embodiment.

FIG. 4 is a logical block diagram of a gaming machine showing relevant data and software modules in accordance with one embodiment of the present invention. In one embodiment, gaming machine or gaming device 400 generates its own private/public key pair 404 using its own random number generator. A random number generator (not shown) may be a software module in the machine or device that generates pseudo-random numbers according to a mathematical formula with a hidden seed value or it may be a device that generates true random numbers using quantum mechanical phenomenon. The public key is intended to be shared with the public and may be given to any entity which asks for it and wants to communicate securely with gaming machine 400. The private key is used by gaming machine 400 to decrypt ciphertext that it has received from other sources that have sent text encrypted using the public key.

An SSL module 408 may be used for secure communications with a gaming network. Depending on the role of gaming machine 400 in a particular network configuration, SSL module 408 may have both client and server SSL software or only one. In another embodiment, the gaming machine may have a Transport Layer Security (TLS) module. It is possible that the gaming machine may function in the role of server in a communication, in which case it will utilize SSL server software. In any case, which SSL software the gaming machine has (or whether it performs the role of server or client) is not directly related to the security features of the described embodiments.

Figure 5:
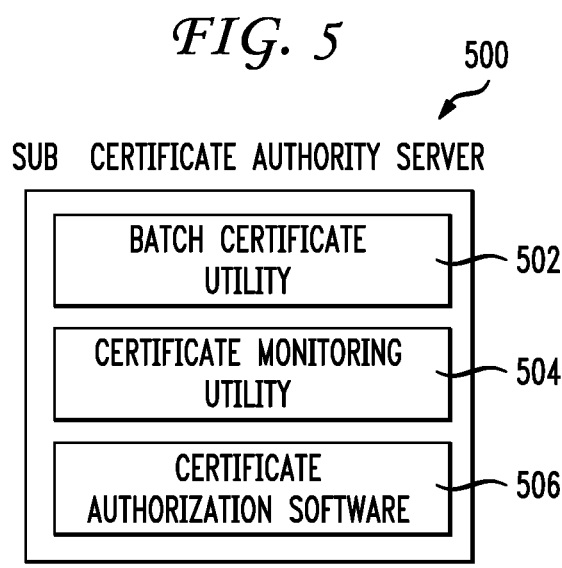
FIG. 5 is a logical block diagram showing software modules and utility programs in a sub-CA server in accordance with one embodiment.

Another software module in gaming machine 400 is software module 402 for generating a certificate signing request (CSR). As is known in the art, a CSR may also be known as a Certification Request Syntax Standard as defined by Public Key Cryptography Standard #10. A CSR typically contains information that uniquely identifies gaming machine 400, and the public key that was generated by the machine itself. The corresponding private key is used to sign the entire certificate request so that information that uniquely identifies the gaming machine is protected from tampering. When generating the CSR, a user, such as a casino floor operator or other casino employee, specifies information that uniquely identifies the machine, such as machine ID (GMID) through, for example, a touchscreen monitor. The purpose of the CSR is described in greater detail below. In one embodiment, it is generated on the gaming machine without intervention or additional data or instructions from external sources and may be described as a request form prepared by the gaming machine, which is eventually placed on a memory device, such as a USB device. In one embodiment, software in the gaming machine manages the storing of the CSR on the USB device (or other suitable memory device) with USB drive software 406 and also manages the retrieval of issued certificates and root and intermediate certificates, which occurs at a later stage in the process. FIG. 5 is a logical block diagram showing software modules and utility programs in a sub-CA server 500 in accordance with one embodiment. As noted above, once a memory device has been loaded with CSRs (stored, for example, in a batch file on the device) from the gaming machines, the device is handed off by the casino floor operator to a CA security officer who downloads the CSRs (e.g., the entire batch file) onto the appropriate sub-CA server (e.g., the server that manages a certain section of gaming machines on the casino floor).

In one embodiment server 500 contains certain software and utility programs that may be used to process the CSRs efficiently and create issued certificates. In one embodiment sub-CA 500 may have what can be referred to as a CSR batch utility program 502. This utility program may be used to efficiently process the CSRs that are downloaded from the memory device. In one embodiment, program 502 reads the CSR files from the memory device and verifies a digital signature in each CSR file to ensure that the information has not been tampered with. In one embodiment, a CSR contains a digital signature of the CSR created using the gaming machine's private key. The gaming machine's public key is also contained in the CSR and is used by program 502 to verify the digital signature. If the decryption is successful, program 502 knows that the CSR has not been tampered with. Other data in a CSR may include a common name, country name, state, organization, organization unit, and data uniquely identifying the gaming machine (e.g., GMID). In one embodiment, batch utility program 502 stores the issued certificates on the USB device which is physically taken back to the gaming machines by the casino floor operator. Utility program 502 is described further in FIG. 8 and example user interface screenshots are described in FIGS. 12A to 12D.

In one embodiment sub-CA server 500 may have a certificate monitoring utility program 504. This program may be used to monitor issued certificates for expiration dates. As is known in the art, certificates, such as those formatted according to the x.509 standard, typically have an expiration date. Once a certificate expires, it may no longer be used to authenticate a gaming machine, gaming server, or other network component. If a gaming machine's certificate expires and the machine is unable to authenticate itself (i.e., perform a handshake with a gaming network communication server), the machine can no longer receive or transmit data to the network and is essentially disabled. To avoid the situation of a gaming machine going offline unexpectedly, which can be quite severe and damaging to a casino's operations if it happens to dozens or hundreds of machines at the same time, utility program 504 monitors the expiration dates and notifies casino employees at predetermined times as to when a certificate will expire (e.g., at 7 days, 5 days, 24 hours etc. before expiration) so that a new CSR may be generated on the gaming machine and can be used to obtain a fresh certificate from the trusted CA or so that a renewed certificate may be issued and provided to the machine well before expiration. If a new CSR is needed because of an expired certificate, a floor operator may go to the gaming machine and upload a newly generated CSR onto the USB device and obtain a new certificate for the machine using processes described below. If the certificate has not yet expired, the CSR may be generated on the machine and transmitted to the sub-CA server over the gaming network over an SSL or TSL connection. This is possible since the machine's certificate has not yet expired and may be used to establish a session with the sub-CA server which can ensure security. The CSR may also be uploaded to a USB device as would be done if the certificate had expired. In the scenario where the certificate has not expired but is being renewed, the gaming machine may keep the same private key while extending the life (expiration time) of the existing certificate. The time that a certificate is valid may vary widely. In the gaming context, it may be desirable to have shorter expiration times to protect the integrity of the private keys associated with the expiring certificates. Given the length of the private key (e.g., 1024 bytes), a safe expiration period for a gaming machine certificate may be five years. Certificates may be replaced if the trusted CA's private key is lost or compromised or if the gaming machine loses its own private key, possibly during a game software update or during another operation on the machine that somehow affected the machine's non-volatile memory. A new private/public key pair should be generated when a new CSR is generated. The old pair is discarded and the CA revokes the certificate. The number of employees to be notified for certificate expiration may be set by the gaming operator, as can the mode of notification (e.g., e-mail, SMS, phone call, and the like). These options and features can be set using a user interface of monitoring utility 504.

One example of a monitoring utility user interface screenshot is shown in FIG. 11 For example, persons to be notified may be added (along with desired mode of contact and contact information), removed, and edited. A user, such as the CA security officer or other employee, may view a list of expired certificates and their expiration dates, arranged by host name (or chronologically by expiration date). Similarly, a user can view a list of certificates that are about to expire within the next n days. As noted, other configurations may also be set such as setting e-mail alert frequency, contact information, SMTP host names, and the like. Other configuration settings may include setting a certificate issuer name, certificate store name, store location, and the "maximum tolerable" days before a certificate expiration date. These are some examples of configurations and settings that may be possible in a certificate monitoring utility. Some embodiments may have more or fewer such configurations and settings.

In one embodiment, sub-CA server 500 contains a certificate services software module 506. Software 506 issues and signs the certificates based on the CSRs downloaded from the memory device. There are numerous third-party vendors that provide such certificate service software packages, such as Microsoft (Microsoft Certificate Services), Red Hat, and Verisign. A person of skill in the art will be aware of various providers of such software that may operate on sub-CA servers to issue, sign, and manage the certificates. It may be noted that certificate services software 506 is needed to issue signed certificates from a trusted CA for the gaming machines. Utility programs 502 and 504 are not necessarily required for issuing certificates but may make the process more efficient and practicable to manage, especially when having to issue certificates for hundreds or thousands of gaming machines. In some embodiments, the sub-CA server may have both, either, or neither of utility programs 502 and 504.

Figure 6A:
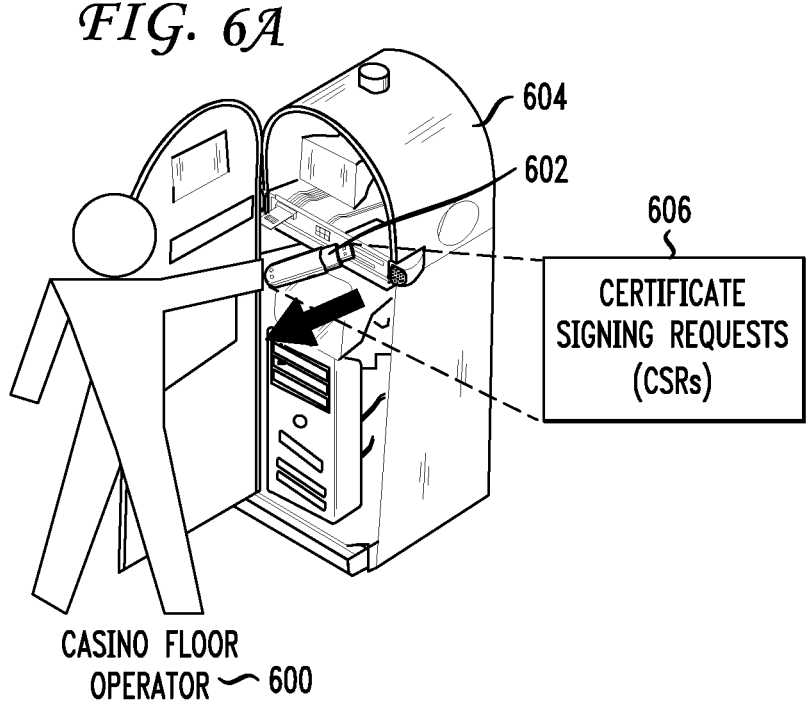
FIGS. 6A and 6B are perspective illustrations showing a casino floor operator de-coupling and coupling a USB device from a gaming machine.
Figure 6B:
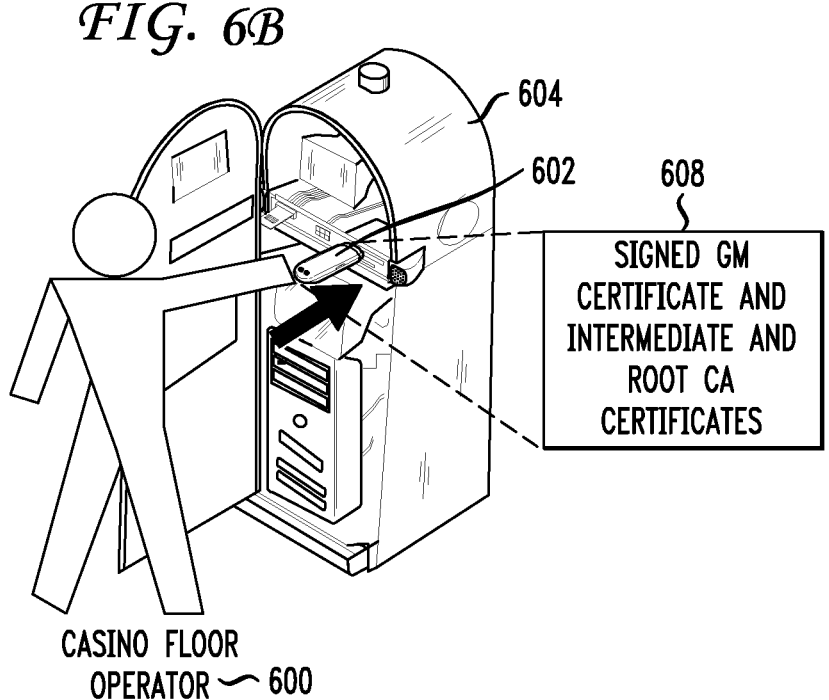

FIGS. 6A and 6B are perspective illustrations showing a casino floor operator inserting or coupling a memory device into a gaming machine and the data stored on the device at different stages in the process in accordance with one embodiment of the present invention. A casino floor operator 600 inserts a USB device 602 into a gaming machine 604. As noted above, other suitable types of re-writable, hot-swappable memory devices that are operable with a gaming machine may also be used. In FIG. 6A operator 600 is removing or de-coupling USB device 602 from machine 604. At this stage (which may be described as the first half of the overall process), gaming machine 604 has stored a certificate signing request 606 onto USB device 602. Certificate signing request 606 may be stored in a batch file on memory device 602 along with other CSRs from other machines (although it is possible that only one or a few CSRs may be stored on the device before being taken to the sub-CA server). The CSR may be stored as a CSR file having a unique name based on the GMID. This file may be stored along with other CSR files, each having unique file names based on respective GMIDs from other machines. FIG. 6B is similar illustration showing floor operator 600 inserting or coupling memory device 602 into gaming machine 602 in the second half of the process. At this stage, memory device 602 may contain multiple issued gaming machine certificates, represented by box 608, (e.g. x.509 certificates) one of which belongs to specific gaming machine 604. It may also have copies of certificates associated with the intermediate sub-CA servers and the root CA server, also represented by box 608. Copies of these certificates and the original gaming machine certificate are downloaded onto gaming machine 604 from memory device 602. These processes are described in greater detail below. The gaming machine certificates may be stored in a "cert" directory or folder on memory device 602.

Figure 7:
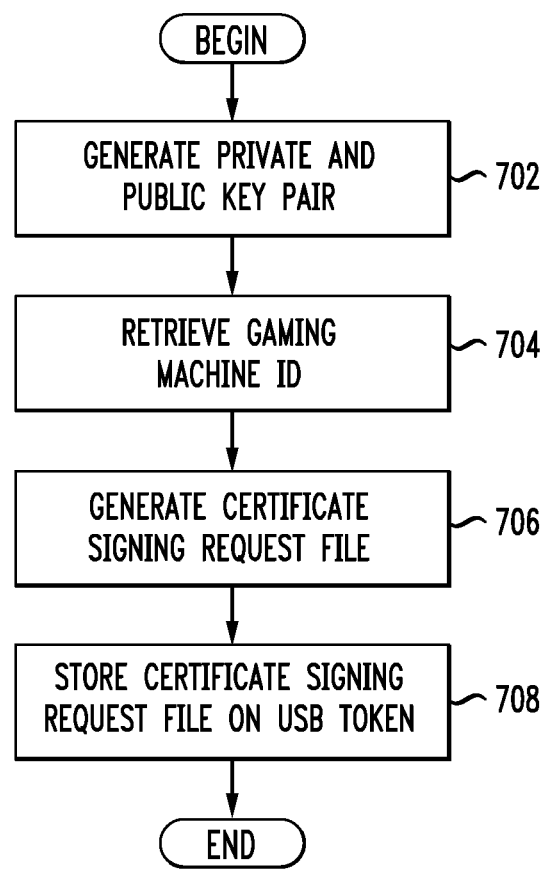
FIG. 7 is a flow diagram of a process of generating a CSR and storing the CSR on a USB device in accordance with one embodiment.

FIG. 7 is a flow diagram of a process of generating a CSR and storing the CSR on a USB device in accordance with one embodiment of the present invention. At step 702 the gaming machine generates a public and private key pair using a random number generator. The key pair is suitable for implementing secure communications (e.g., SSL) between the gaming machine and gaming network comm server or other machines by enabling the components to authenticate each other. For example, during initial installation and powering up of a gaming machine at a casino, the machine may generate its own private and public key pair and may also generate a CSR file using its gaming machine identifier (GMID) as a "common name" in the CSR, where the common name is a name used to identify the certificate recipient's name. As described above, a gaming machine must have a valid, unexpired and signed certificate which contains the public key of the machine in a form that can be read by a requesting entity, such as a gaming network comm server. The corresponding private key is kept securely in the gaming machine, for example, in a hardware security module or may be encrypted and stored in its hard drive or secure memory. As is known in the art, it is critical to keep the private key of the gaming machine using PKI (or any network component) highly secure. There are typically strong security procedures, such as the use of hardware security module, in place to keep it safe.

At step 704 the GMID or other unique identifiers of the machine, such as a MAC address or a host name, is retrieved. Although the term "retrieved" is used in this context, the GMID is a value that may be accessible or present in the component or module performing the process and, thus, may not necessarily need to be retrieved. At step 706 a CSR file is generated in the gaming machine. In one embodiment, the CSR file is formatted according to the PKI #10 standard, a format known in the cryptography and computer security field and contains the current public key of the gaming machine. A CSR may also contain certain data associated with the gaming machine, such as GMID (obtained at step 704), MAC address, host name, and the like. Generally, the data contained in a CSR is public and, if compromised or stolen, would not jeopardize the security of the gaming machine or of communications in the network at large. The gaming machine certificate contains the public key of the machine and is signed by a trusted CA. That is, it is encrypted using the CA private key and, thus, can be decrypted using the CA's public key, which is published in the CA's certificate. At step 708 the CSR is stored on a USB key that has been inserted into the gaming machine as shown in FIG. 6A. The step of generating a CSR in step 706 is initiated when the casino floor operator enters instructions indicating that the CSR should be generated. As noted above, the CSR may be placed in a batch file on the USB device so that it may be processed by batch certificate utility program 502 described above. At this stage the process of generating a CSR on a gaming machine and storing it on a memory device is complete.

Figure 8:
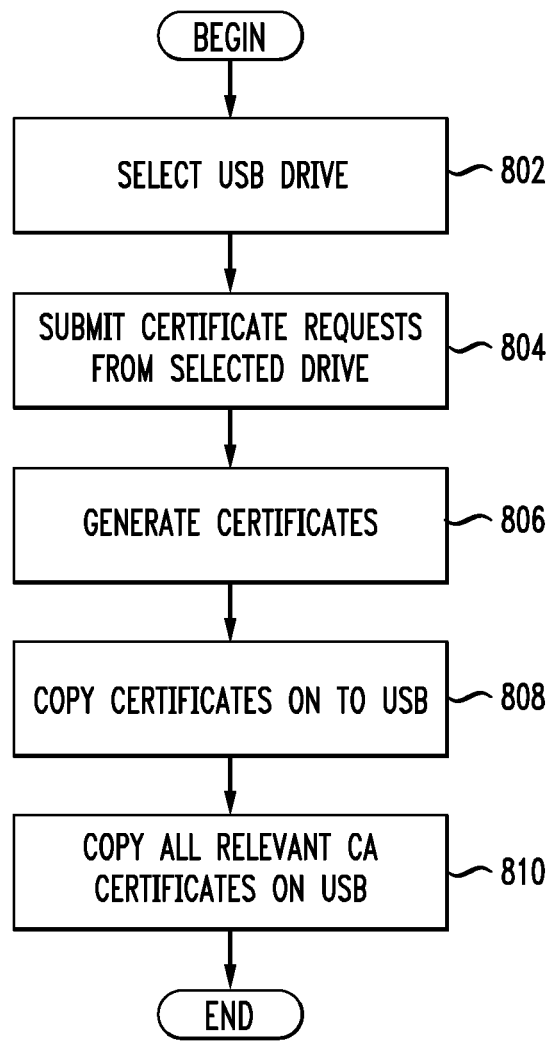
FIG. 8 is a flow diagram showing a process of issuing certificates by a trusted CA via a sub-CA server in accordance with one embodiment.

FIG. 8 is a flow diagram showing a process of issuing certificates by a trusted CA via a sub-CA server in accordance with one embodiment of the invention. At this stage the casino floor operator has given possession of the memory device storing the CSRs to a CA security officer or other qualified employee who has authorization to operate the sub-CA servers at the casino. In one embodiment, no other data or information, for example, passwords, is provided to the CA security officer by the floor operator and nor is there any data transmitted to the sub-CA servers via any type of wired or wireless network connection. At step 802 the security officer selects a USB port in the sub-CA server which the USB device will be inserted. Once the appropriate USB drive is selected and the USB device has been inserted, at step 804 the security officer provides instructions to submit the CSRs to the sub-CA server. As described above, a mass certificate submission utility, implemented as a wizard, may be utilized to submit and process the CSRs from the USB device. The signing requests are submitted to the certificate authority software 506 for actual issuance of the gaming machine certificates.

At step 806 certificate authority software 506 executes the software functions needed for issuing the certificates based on the CSRs. Each certificate is typically generated individually based on individual CSRs, but a batch of CSRs may be submitted sequentially without operator intervention for each CSR to the certificate services software using batch certificate program 502 as described above. Processes for issuing certificates for example, x.509 certificates, are known in the field and are implemented by various software providers as noted above. At step 808 the issued certificates are transferred onto the USB memory device, for example, into an appropriate directory on the device, such as a "cert" directory or similar location. In one embodiment, copies of relevant CA certificates are also transferred onto the USB device. These may include copies of the trusted CA server certificate and certificates of some or all of the intermediate sub-CA servers in the hierarchy shown in FIG. 3. This is done at step 810. As described below, these certificates may be used to authenticate the gaming machine certificate, certificate revocation lists, and the like. At this stage, a process of storing issued gaming machine certificates and copies of other CA server certificates onto the memory device at the sub-CA server is complete. In another embodiment, the certificates are placed in a shared folder on the sub-CA server instead of being stored on the USB device. The gaming machines retrieve their specific gaming machine certificate (for example, by examining file names) and copies of the other CA certificates over the gaming network using File Transfer Protocol (FTP) or Hyper Text Transfer Protocol (HTTP). It is not required that the transmission of these certificates take place over a secure connection given that all the data is public. Once the certificates are on the gaming machine, the process continues in the same manner as if they were downloaded from a USB device at the machine.

In one embodiment, the CA security officer removes the USB device from the server and physically hands the device to a casino floor operator or other employee trusted by the casino to possess and utilize the memory device. In addition to receiving the memory device, the casino floor operator may also be given a printout of the thumbprint of the CA root certificate or the public key of the trusted CA server to be used for verification by the operator while at the gaming machine as described below. The thumbprint may be the SHA-1 hash value of the entire root certificate. In one embodiment, no other data, such as passwords or other sensitive data is given to the floor operator. Data on the USB device may be considered to be data that is not necessarily sensitive or confidential. Although it is generally desirable that the data not be compromised, lost, or tampered with, if such events were to occur, the security of the gaming network would not necessarily be jeopardized.

Figure 9:
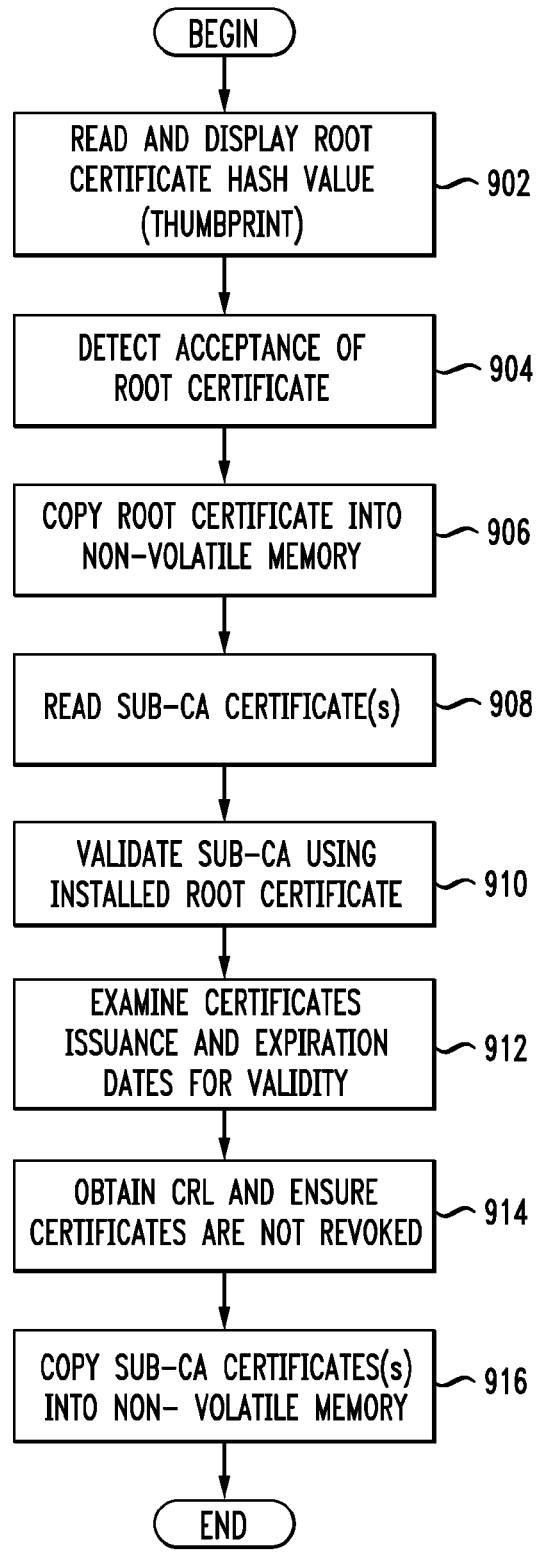
FIG. 9 is a flow diagram of a process of downloading copies of CA and sub-CA certificates onto a gaming machine from a USB device in accordance with one embodiment.

FIG. 9 is a flow diagram of a process of downloading copies of CA and sub-CA certificates onto a gaming machine from a USB device in accordance with one embodiment with the present invention. At this stage a casino floor operator has taken the USB device to a gaming machine. The operator may take the device to multiple gaming machines in order to install issued certificates on the machines and, thus, repeat the process described in FIG. 9 at multiple machines upon inserting the USB device into the gaming machine. After opening the machine door, the gaming machine software may read hash value or other signature value of the trusted root CA certificate from the device and display the value on the gaming machine monitor. In one embodiment the casino floor operator performs a visual comparison of the displayed root CA certificate hash value with the printout obtained from the CA security officer. If the values are the same, the operator indicates acceptance of the trusted root CA certificate that was read from the USB device, for example, by pressing an 'Enter' key or other button in the gaming machine or on the gaming machine touch screen monitor. If they are not the same, the operator discontinues the process and records the different values for analysis by casino security employees. In case of a mismatch, the gaming machine software does not read any further data from the USB device. If the visual comparison performed by the operator affirms the authenticity of the root certificate of the trusted CA, at step 904 the gaming machine detects acceptance of the of the root CA certificate by the floor operator. By performing this step, it is ensured that the trusted root CA certificate on the USB device that is being copied onto the gaming machine has not been tampered with between the time it was removed from the sub-CA server by the CA security officer and inserted into the gaming machine by the casino floor operator. At this stage, the gaming machine can trust the root CA certificate and can use it to authenticate intermediate sub-CA certificates, the issued certificate to the machine itself, and other documents, such as certificate revocation lists, as described below.

At step 906 a copy of the trusted root CA certificate is loaded into the gaming machine's non-volatile storage or other suitable storage where it will be stored persistently. Non-volatile memory is preferred so that the trusted CA public key may be maintained by the gaming machine in case of power outages, tilts, and other unexpected occurrences that may affect data. At step 908 the gaming machine loads relevant intermediate sub-CA certificates on the USB device.

The number of such certificates will depend on the number of sub-CA servers in the hierarchy as described above. At step 910 the sub-CA certificates are validated using a process referred to as certificate chain validation. The private key of root CA certificate is used to create the digital signature (e.g., the hashed value of the sub-CA server's certificate encrypted using the private key) that is contained in the sub-CA server's certificate. The root CA certificate contains its public key and it is assumed that the gaming machine trusts the root CA (which has been verified through visual inspection at steps 902 and 904). The gaming machine can use the public key of the root certificate to validate the digital signature contained in the sub-CA certificate. If the sub-CA issues certificates to its own sub-CAs or to a gaming machine, the same process may be used to validate those certificates; the "parent" sub-CA certificate's private key is used to create the digital signature that is contained in the "children" sub-CA certificates.

At step 912 the gaming machine may validate that the issuance date of the gaming machine certificate is after the gaming machine's internal clock time/date and that the expiration date has not passed. It may also verify the issuance and expiration dates for the sub-CA and root CA certificates are still valid relative to the machine's internal clock. If they are not, the machine will reject the certificate and an appropriate message will be displayed to the floor operator or the CA security officer. At step 914 one or more certificate revocation lists ("CRLs") may be downloaded from the sub-CAs and the root CA to ensure that none of the certificates have been revoked. Revocation of a certificate may occur for a variety of reasons and may be considered an atypical event (in contrast to normal certificate expiration). It may occur because it is discovered that private key of the certificate has been compromised or that the issued certificate is no longer valid because the machine associated with the private key is broken and needed to be returned back to the manufacturer for servicing. The use of such lists and how they are obtained are described in greater detail below. Once these safeguards have been performed, the machine may proceed to copy the certificates. At step 916, the sub-CA certificates are copied into non-volatile memory of the gaming machine and may be stored with the trusted CA certificate. At this stage a process of copying the required CA certificates onto the gaming machine from the USB device is complete.

Figure 10:
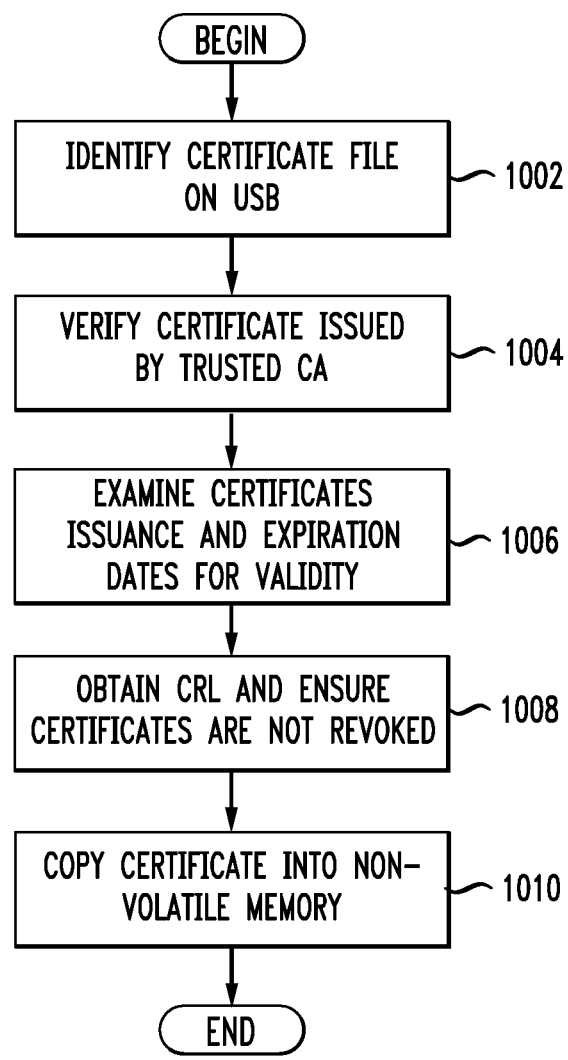
FIG. 10 is a flow diagram of a process of transferring an original gaming machine certificate from a USB device onto a gaming machine in accordance with one embodiment.

FIG. 10 is a flow diagram of a process of transferring or writing an issued gaming machine certificate from a USB device onto a gaming machine in accordance with one embodiment. Once copies of the CA certificates have been loaded onto the gaming machine and while the USB device is coupled to the machine, gaming machine software finds the actual gaming machine certificate (used for communication with the comm servers) within the USB device and validates or ensures that the certificate is issued by a trusted sub CA using certificate chain validation. During the validation, the gaming machine software also ensures that if each of the sub CA certificates has not been revoked by its parent CA. The gaming machine software also checks if the gaming machine's internal time clock is between the certificate's issued date and expired date. If the validation is successful, the machine copies the certificate to its non-volatile memory. In one embodiment, no additional steps need to be taken by the casino floor operator to initiate this process; it may occur automatically if the requisite steps of transferring the CA certificate copies onto the machine were successful.

At step 1002 the gaming machine identifies the appropriate certificate file on the USB device by examining file names on the device. In one embodiment, the gaming machine identifier (GMID) is used as a file name or part of the name. Once the gaming machine has identified a certificate file, at step 1004 the gaming machine validates or verifies that the file selected is, in fact, the gaming machine certificate. The gaming machine knows its own GMID since it was used to create the CSR. In one embodiment, the same GMID is used for the certificate file name. The gaming machine checks to ensure that the certificate was issued by a trusted CA and that the certificate corresponds to the private key stored by the gaming machine. As described above, this may be done using certificate chain validation. At step 1006, similar to step 912, the gaming machine may validate that the issuance date of the gaming machine certificate and of the CA certificates are after the gaming machine's internal clock time/date and that the expiration date has not passed. If they are not, the machine will reject the certificate and an appropriate message will be displayed to the floor operator or the CA security officer. At step 1008 one or more certificate revocation lists ("CRLs") may be downloaded from the sub-CAs and the root CA to ensure that none of the certificates have been revoked. Once these safeguards have been performed, the machine may proceed to copy the certificates. At step 1010 the certificate may be written to the gaming machine's non-volatile memory. Now the gaming machine has the certificate issued by the trusted CA with the public key that corresponds to its own private key for SSL. At this stage, the casino floor operator removes the USB device and may proceed to the next machine if there are other certificates that need to be installed.

As noted above, the certificate issued by the trusted certificate authority and stored on the USB device contain data relating to the gaming machine, such as GMID, MAC address, host name, etc. and the public key being issued to the gaming machine, possibly among other data. The certificate is signed by the trusted CA using the trusted CA private key, that is, the hash value of the certificate is encrypted using the CA's private key (as is known in the art, encryption of the hash value of the certificate using the private key is a signature). The encrypted hash value of the certificate may then be decrypted and then compared with the plaintext hash value of the certificate. In this manner the certificate is verified using the CA's public key. Only this public key can decrypt the signed certificate. The public key is contained in the trusted CA certificate which is downloaded from the USB device onto the machine at step 906 above. The hash value of the gaming machine certificate is encrypted using the CA private key. The CA public key is used to decrypt the hash value of the gaming machine certificate. The decrypted hash value is compared with the hash value of the gaming machine certificate thus verifying that the certificate is issued by the trusted CA.

As described above, a hashed value of the root CA certificate is displayed on the gaming machine at step 902. The value may be compared with a printout of the hashed value of the certificate by the casino floor operator. If they are the same, the floor operator proceeds and the gaming machine can trust the certificate.

FIG. 11 is a diagram of a screenshot from the user interface of certificate monitoring utility 504 in accordance with one embodiment. A sample screenshot 1100 for a "Certificate Monitoring Utility," as stated at the top may have several buttons activating functions and windows for entering data. After sample explanatory text describing the utility, a "User Management" section has three sample functions relating to users or casino employees. Button interface 1102 enables adding a user, button interface 1104 enables editing user information, such as contact details, and button interface 1106 enables removing a user from a notification list. A user may be any appropriate casino security employee whose responsibilities include managing certificates in the gaming network. Box 1108 may provide a list of users with a select box that facilitates editing user information and removing users. Another box (not shown) may be displayed when adding a new user.

Below box 1108, in one embodiment, is a "Set Configuration" area 1110 that has several windows for entering user configuration data, such as SMTP Host Name, e-mail addresses, certificate store name, alert frequency, and other data as shown in FIG. 11. In one embodiment, area 1112 at the bottom of the screenshot may display button interfaces for starting and stopping the monitoring utility and for fetching lists of expired or expiring certificates. In other embodiments, there may be additional button interfaces for performing other functions relating to the monitoring utility or there may be fewer.

Figure 12D:
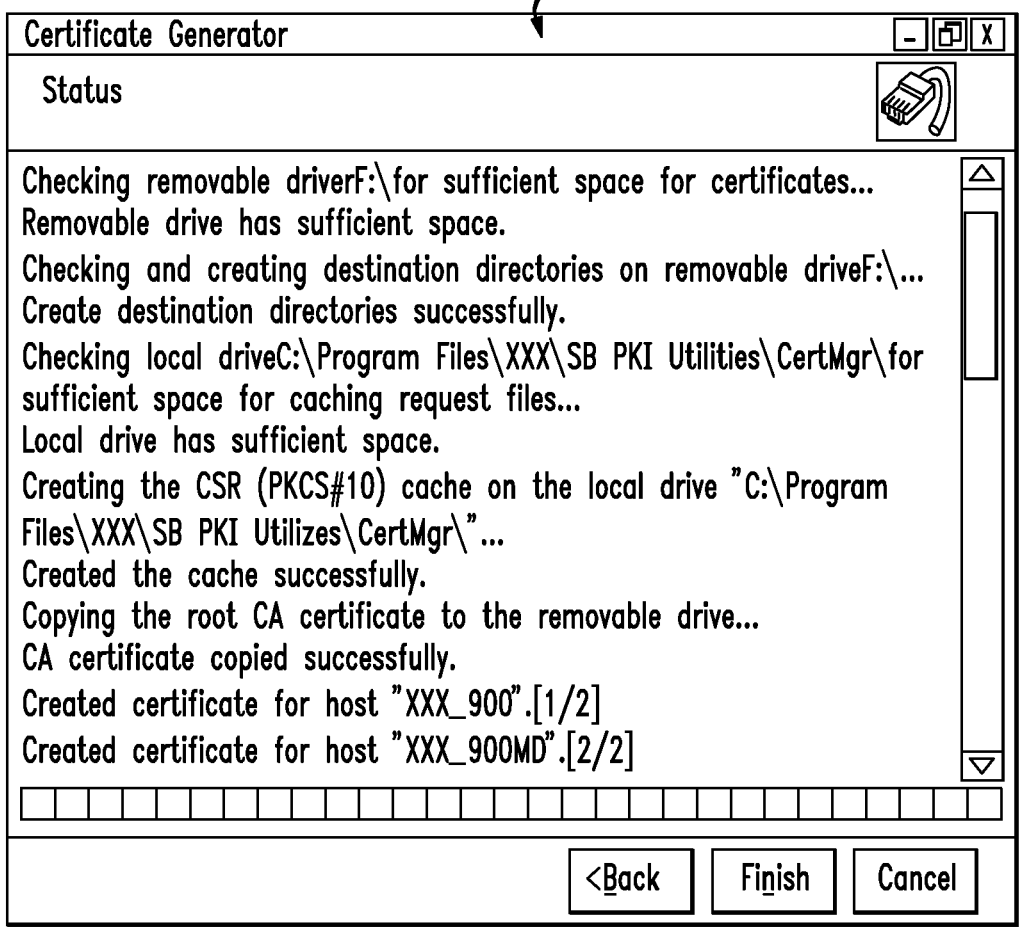

FIGS. 12A to 12D are diagrams of sample screenshots from a user interface of certificate batch utility 502 in accordance with one embodiment. In one embodiment, certificate batch utility 502 is presented to a user as a series of screens asking the user to enter data in steps (often referred to as a wizard). FIG. 12A is a sample initial screenshot 1202 of a "Certificate Generator" wizard briefly explaining the functions of the utility and providing buttons to enable the user to move to the next step in the process. FIG. 12B is a sample screenshot 1204 showing how a user can select a USB port in which the USB device (or drive) has been inserted. In other embodiments, other types of ports or drives may be offered depending on the type of memory device used. In the example shown, the CSR files are in .p10 format but other formats for certificate request files may also be used. A screenshot 1206 shown in FIG. 12C allows users to select gaming machines or devices (hosts) for which certificates should be generated. A window may provide a list of gaming machines by GMID or host name. FIG. 12D is a screenshot 1208 showing the status of the certificate generator after having selected gaming machines for which certificates will be issued. For example, the USB device is checked for available space, destination directories are created, a CSR cache is created on the local drive, the root CA certificate is copied to the USB device, and so on. The amount of data that is shown to the user in the status window can vary widely. In one embodiment, at the end of the certificate generation the CA security officer or user is notified that certificates for certain gaming machines (listing each one by GMID or other unique identifier) have been created and copied onto the memory device.

The gaming machine's public and private keys, typically 1024 bytes in length, are kept very securely. They are used to identify the gaming machine to a comm server or other network component, for example, in a server-based gaming network. Once this authentication or handshake is performed (the comm server may also verify its identity to the gaming machine), the two components may exchange a session key for symmetric key encryption which provides much faster performance for bulk encryption. The symmetric key is typically shorter although sufficiently secure, and the routine communication between the two components uses the symmetric key for encryption and communication of bulk gaming data. In one embodiment, the comm server may have a hardware load balancer or a hardware security module that performs SSL acceleration and performs other encryption operations. Examples of protocols used for communication between the gaming machine and the comm server include G2S and S2S that are implemented in SSL.

In one embodiment, the gaming machine checks for certificate revocations to ensure that the certificate it receives from a comm server has not been revoked, has not expired, and the like. The gaming machine may want to ensure that the server has not been disabled or designated as a rogue server. The server may perform a similar operation when it receives the gaming machine certificate. In one embodiment this may be done by the gaming machine sending a message, via a network connection, to the sub-CA requesting a certificate revocation list. The message need not be encrypted or secured, nor does it need to be sent over a secure network connection. The request itself (e.g., "get CRL" in plaintext) does not contain confidential data and the CRL does not contain confidential or particularly sensitive information. As is known in the art, a CRL identifies certificates that have been revoked, or which have any type of issues or problems that must be addressed before a certificate can be used. In one embodiment, the gaming machine verifies that the CRL that is received in response to the request is a genuine one that is published by a legitimate sub-CA. This may be done by verifying the digital signature of the CRL with the public key stored in CRL issuing CA's certificate. In one embodiment, the sub-CA may have a CRL distribution point that is different from the sub-CA. Once the gaming machine has validated the certificate from the server (during the handshake) against the CRL, published by the comm server sub-CA (which maintains the CRL for certificates issued to servers), a session key may be exchanged. As noted, the server may perform the same operations, except that it may obtain a CRL from the gaming machine sub-CA server, which maintains CRLs issued to gaming machines. In one embodiment, the gaming machines and the servers verify the certificates they receive against the CRL issued by the trusted CA, which may also have a CRL distribution point.

While the invention has been particularly shown and described with reference to specific embodiments thereof, it will be understood by those skilled in the art that changes in the form and details of the disclosed embodiments may be made without departing from the spirit or scope of the invention. For example, embodiments have been described in which a USB device is used to store the CSRs and certificates. In other embodiments, various other types of memory devices may be utilized. In another example, the trusted or root CA may be the only CA server used and no sub-CA servers are needed. In another example, formats and standards other than PKCS #10 may be used.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method of obtaining a certificate for authenticating a gaming machine to components in a gaming network, the method comprising:

generating, by the gaming machine, a certificate signing request for obtaining an issued certificate from a certificate authority, the signing request containing a gaming machine public key, a gaming machine identifier, and a digital signature of the gaming machine;

encrypting, by the gaming machine, the signing request using a gaming machine private key;

detecting, by the gaming machine, a first coupling of a memory device with the gaming machine, wherein the memory device includes a plurality of previously accumulated certificate signing requests from a plurality of gaming machines; and storing, by the gaming machine, the signing request on the memory device with the plurality of previously accumulated certificate signing requests;

wherein a certificate is created based on the certificate signing request by the certificate authority for use by the gaming machine.

2. A method as recited in claim 1, further comprising:

detecting, by the gaming machine, a second coupling of the memory device;

displaying on a display of the gaming machine a value associated with the certificate authority certificate;

identifying a specific certificate file on the memory device using the gaming machine identifier; and storing the specific certificate file on the gaming machine, wherein the specific certificate file contains the certificate created by the certificate authority.

3. A method as recited in claim 2, further comprising detecting confirmation of validity of the value associated with the certificate authority certificate.

4. A method as recited in claim 2, further comprising verifying the certificate by performing a certificate chain validation utilizing the certificate authority certificate.

5. A method as recited in claim 2, further comprising storing a copy of the certificate authority certificate.

6. A method as recited in claim 2, further comprising storing copies of one or more subcertificate authority certificates.

7. A method as recited in claim 1, wherein a secure communication channel between the gaming machine and a host server in a gaming network is enabled using the certificate.

8. A method as recited in claim 1, wherein the value associated with the certificate authority certificate is a hash value of the certificate.

9. A method as recited in claim 1, wherein the certificate authority is a root certificate authority.

10. A method as recited in claim 1, further comprising:

receiving the certificate created by the certificate authority over a network;

receiving a value associated with the certificate authority certificate; and displaying the value on a gaming machine monitor.

11. A method as recited in claim 2, further comprising examining a first certificate revocation list to determine whether the certificate authority certificate has been revoked.

12. A method as recited in claim 6, further comprising examining a second certificate revocation list to determine whether the one or more sub-certificate authority certificates have been revoked.

13. A method as recited in claim 2, further comprising comparing a first issuance date and a first expiration date of the certificate against a gaming machine internal clock.

14. A method as recited in claim 1, wherein the memory device is a removable, rewritable memory storage device.

15. A gaming system comprising:

a certificate authority server having a batch certificate processing program and a certificate monitoring program;

a gaming machine having a certificate signing request module and a gaming machine certificate issued by the certificate authority server, wherein the gaming machine is configured to:

generate a certificate signing request for obtaining an issued certificate from the certificate authority server, wherein the signing request includes a gaming machine public key, a gaming machine identifier, and a digital signature of the gaming machine, and store the certificate signing request on a memory device, wherein the memory device includes a plurality of previously accumulated certificate signing requests from a plurality of gaming machines; and a gaming server having a server certificate.

16. A gaming system as recited in claim 15, wherein the batch certificate processing program processes one or more certificate signing requests obtained from a memory device coupled to the certificate authority server.

17. A gaming system as recited in claim 16, wherein the batch certificate program stores gaming machine certificates on the memory device.

18. A gaming system as recited in claim 15, wherein the certificate monitoring program monitors expiration dates for a plurality of gaming machine certificates.

19. A gaming system as recited in claim 15, wherein the certificate authority server is a root certificate authority server.

20. A gaming system as recited in claim 19, wherein the root certificate authority is operated by a third-party provider and wherein the gaming machine and the gaming server are operated by a gaming operator.

21. A gaming system as recited in claim 15, wherein the certificate authority server is a sub-certificate authority server operated by a gaming operator.

22. A gaming system as recited in claim 16, wherein the gaming machine stores a certificate signing request on the memory device when coupled to the gaming machine.

23. A gaming system as recited in claim 15, wherein the certificate monitoring program has a user interface which allows setting user notifications and related configurations.

24. A gaming system as recited in claim 15, wherein the certificate is transmitted to the gaming machine from the certificate authority server over a network.

25. A gaming system as recited in claim 16, further comprising a secure network connection between the gaming machine and the gaming server established using the gaming machine certificate and the server certificate.

* * * * *